(12) United States Patent
Dunmire

(10) Patent No.: US 7,744,349 B1
(45) Date of Patent: Jun. 29, 2010

(54) BLADE FLAP LOCKING FOR OUT-OF-USE HELICOPTERS

(75) Inventor: Daniel F. Dunmire, Stony Brook, NY (US)

(73) Assignee: Davis Aircraft Products Co., Inc., Bohemia, NY (US)

( * ) Notice: Subject to any disclaimer, the term of this patent is extended or adjusted under 35 U.S.C. 154(b) by 960 days.

(21) Appl. No.: 11/518,677

(22) Filed: Sep. 11, 2006

(51) Int. Cl.
*B64C 27/39* (2006.01)
*B64C 27/50* (2006.01)

(52) U.S. Cl. .................. 416/140; 416/107; 416/143

(58) Field of Classification Search ............. 416/106, 416/107, 117, 118, 138, 142, 143, 153, 140
See application file for complete search history.

(56) References Cited

U.S. PATENT DOCUMENTS

| | | | |
|---|---|---|---|
| 2,906,348 A | * | 9/1959 | Lovegrove .............. 416/140 |
| 4,203,708 A | * | 5/1980 | Rybicki ................ 416/134 A |
| 4,289,448 A | * | 9/1981 | Declerco et al. ........... 416/140 |
| 5,951,252 A | * | 9/1999 | Muylaert ................. 416/140 |
| 6,309,182 B1 | * | 10/2001 | Muylaert ................. 416/140 |

* cited by examiner

*Primary Examiner*—Edward Look
*Assistant Examiner*—Nathaniel Wiehe
(74) *Attorney, Agent, or Firm*—Kenneth P. Robinson

(57) ABSTRACT

In the absence of centrifugal force produced during rotation of helicopter blades, damage may result if a blade is rotated upward by wind or other forces. Lock units removably appended between the rotor assembly and each blade pitch housing attached to a helicopter blade are usable to restrict upward rotation. A base portion of a lock unit may be configured to be held in position by a removable pin device. An extendible device extending from the base portion to a surface of a blade pitch housing can be adjusted to press the base portion back against a surface of the rotor assembly. The lock unit thereby restricts these surfaces of the blade pitch housing and rotor assembly from moving closer to each other and thereby restricts upward rotation of the blade pitch housing and its attached helicopter blade. The lock units are readily removable in preparation for returning a helicopter to active use.

20 Claims, 4 Drawing Sheets

BLADE FLAP LOCKING FOR OUT-OF-USE HELICOPTERS

RELATED APPLICATIONS (Not Applicable)

FEDERALLY SPONSORED RESEARCH (Not Applicable)

BACKGROUND OF THE INVENTION

The invention relates to helicopter storage and shipment and, more particularly, to prevention of undesired upward rotation of helicopter blade pitch housings and attached blades during out-of-use periods.

Helicopter blades, during operation, are rotated basically in a plane of rotation which is nominally a horizontal plane. A helicopter blade is typically attached to a blade pitch housing (enabling controlled adjustment of blade pitch) which is attached to the rotor assembly, rotation of which produces blade rotation. While rotating, displacement or rotation of the blades upward from the plane of rotation is limited by the effects of centrifugal force. When out-of-use (e.g., parked, stored, in shipment) no centrifugal forces act on the blades and the blades and pitch housings are permitted to flap downward (called "droop") a small amount under the influence of gravity. Their weight is supported by a droop stop mechanism. When out-of-use the blades are typically unrestrained from a range of upward rotation (e.g., rotation in a vertical plane, about the connection point to the rotor assembly). Such upward rotation may be caused by wind forces while parked or stored, or by sudden altitude or attitude changes or other forces experienced during shipment of a helicopter in a transport aircraft or while being towed on the ground, for example.

During shipment or storage the blades of a helicopter may be folded (i.e., some or all blades positioned toward the tail or nose of the helicopter) while each blade still remains attached to its respective blade pitch housing which remains attached to the rotor assembly (blade folding is further described in U.S. Pat. No. 6,783,327, having a common assignee). Whether or not the blades are folded, upward rotation of a blade pitch housing, during shipment for example, is undesirable and may result in damage to the blade, the blade pitch housing or other components of the rotor blade mechanism, or to the interior area of a transport aircraft immediately above the stowed helicopter. For present purposes, uncontrolled upward rotation of a blade pitch housing (i.e., with its attached blade) of a helicopter which is not in use will be termed "flap". Correspondingly, undesired upward rotation of a blade may be termed "blade flap". Prior mechanisms and techniques have not provided effective limitation of blade flap or have been subject to limitations regarding cost, complexity, reliability, durability or other disadvantages.

Objects of the present invention are to provide new and improved lock units and methods, which may provide advantages such as the following:
  ease of installation;
  reliable operation;
  absence of required aircraft modification;
  cost effectiveness;
  low complexity of construction;
  durability; and
  ease of removal.

SUMMARY OF THE INVENTION

In accordance with an embodiment of the invention, a lock unit usable to restrict upward rotation of a blade pitch housing attached between a rotor assembly and a helicopter blade, includes a base portion having, on a first side, a contact surface to contact the rotor assembly and, on a second side opposed to the first side, a first opening. The base portion is configured to enable the control unit to be removably positioned adjacent appended to the rotor assembly. An extendible device positioned in the first opening is extendible to an extended position to contact the blade pitch housing. The extendible device is configured to releasably retain that extended position to restrict upward rotation of the blade pitch housing.

More particularly, the extendible device may include a threaded shaft having a near end inserted into the first opening in the base portion and also having a far end. A first nut device is rotatable on the threaded shaft to adjustably extend the threaded shaft out of the first opening to position the far end adjacent to the blade pitch housing. In this embodiment the extendable device is configured to apply a thrust force between the rotor assembly and the blade pitch housing when the first nut device is tightened to extend the extendible device forward into contact with the blade pitch housing and to press the base portion contact surface back against the rotor assembly.

Also in accordance with the invention, a method for restricting upward rotation of a blade pitch housing attached between a rotor assembly and a helicopter blade may include the steps of:
 (a) positioning, between the rotor assembly and the blade pitch housing, a lock unit having an extendible device;
 (b) removably appending the lock unit to the rotor assembly with a contact surface of the lock unit adjacent a surface of the rotor assembly;
 (c) extending the extendible device to an extended position to contact the blade pitch housing; and
 (d) releasably retaining the extendible device at the extended position to restrict upward rotation of the blade pitch housing and attached helicopter blade.

For a better understanding of the invention, together with other and further objects thereof, reference is made to the following description, taken in connection with the accompanying drawings and the scope of the invention will be pointed out in the accompanying claims.

DESCRIPTION OF THE INVENTION

Figure 1:
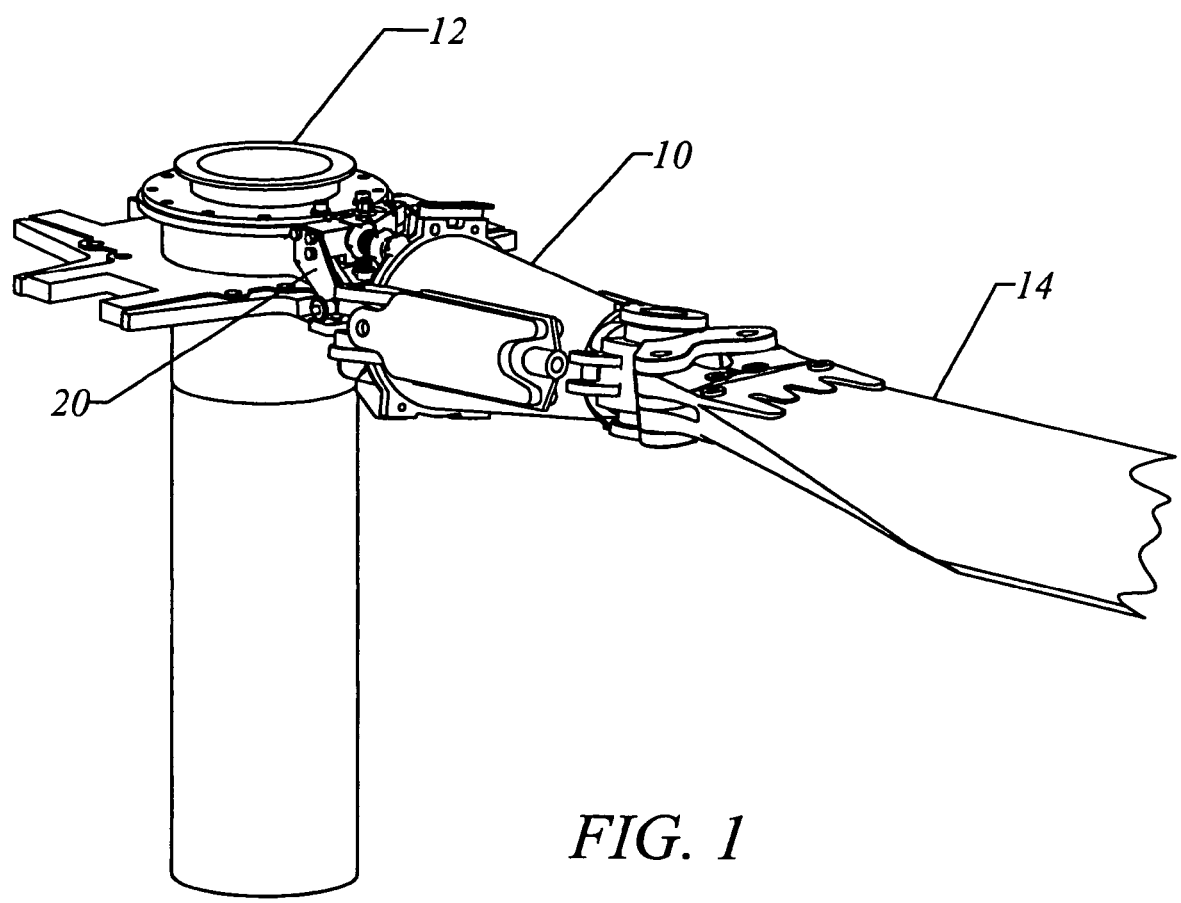
FIG. 1 shows a helicopter rotor assembly with one blade pitch housing and blade attached and a lock unit installed.

FIG. 1 provides an overview showing blade pitch housing 10 attached between rotor assembly 12 and helicopter blade 14, with lock unit 20 removably appended to the rotor assembly. It will be understood that for a typical helicopter there would be attached to the rotor assembly 12 two or more identical blade pitch housing/blade combinations at positions spaced equally around the rotor assembly. Pursuant to the invention, a blade lock unit may be similarly installed at each such position.

Figure 2:
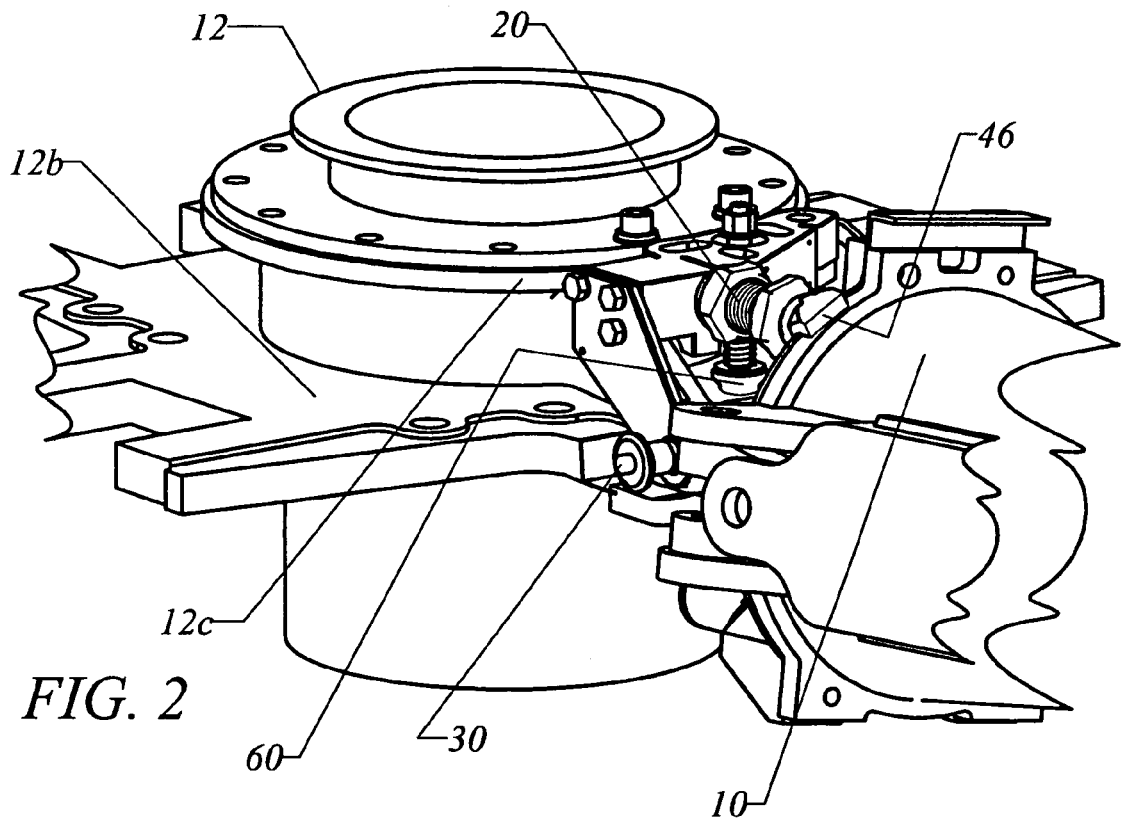
FIG. 2 is an enlarged view of a portion of FIG. 1.
Figure 3:
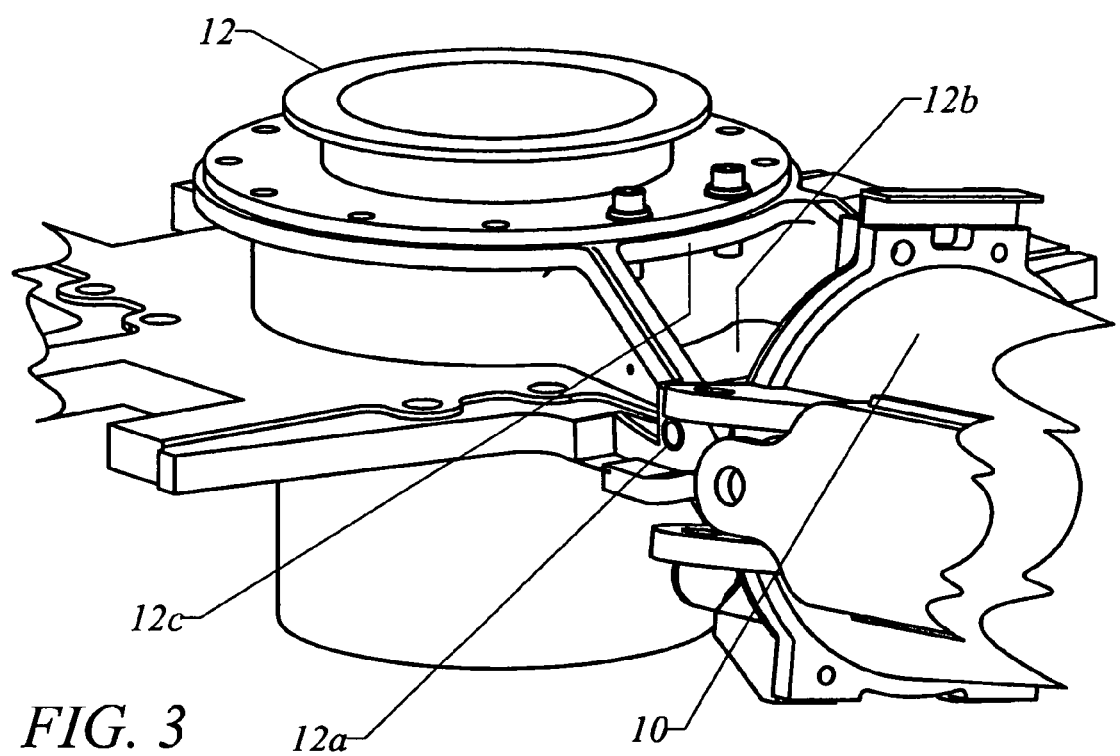
FIG. 3 is a view corresponding to FIG. 2, with the lock unit removed.

FIG. 2 provides a more detailed view of lock unit 20 of FIG. 1. FIG. 3 is a view of blade pitch housing 10 and rotor assembly 12 as in FIG. 2, but with lock unit 20 removed. Other included reference numerals will be referred to below. Thus, FIG. 3 represents these components of a helicopter in operational relationship and FIG. 2 shows the removable inclusion of lock unit 20 to restrict upward rotation of the blade pitch housing and attached helicopter blade during a period in which the helicopter is not in use (e.g., during storage or shipment).

Figure 4:
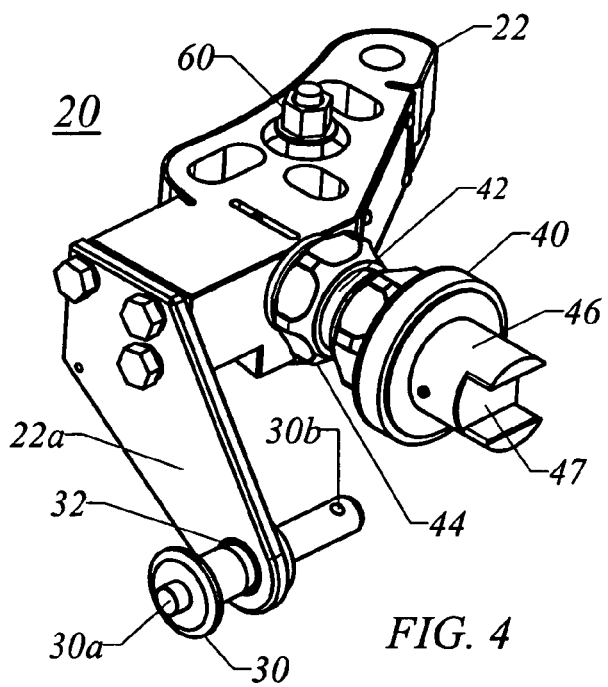
FIG. 4 is a view of a lock unit from above.
Figure 5:
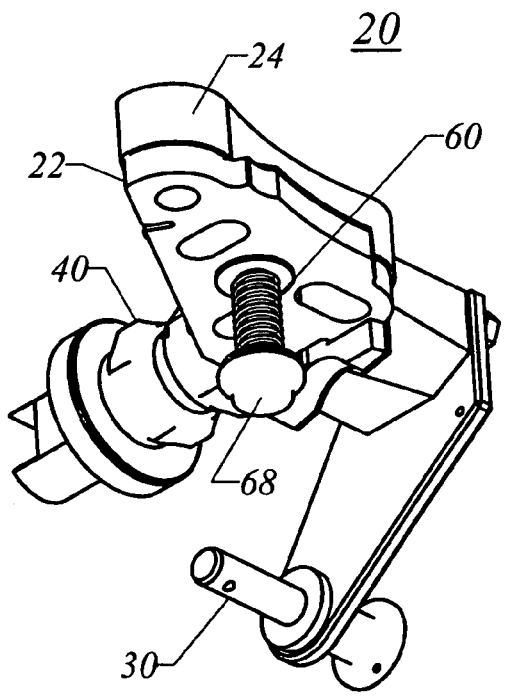
FIG. 5 is a view of the FIG. 4 lock unit from below.
Figure 6:
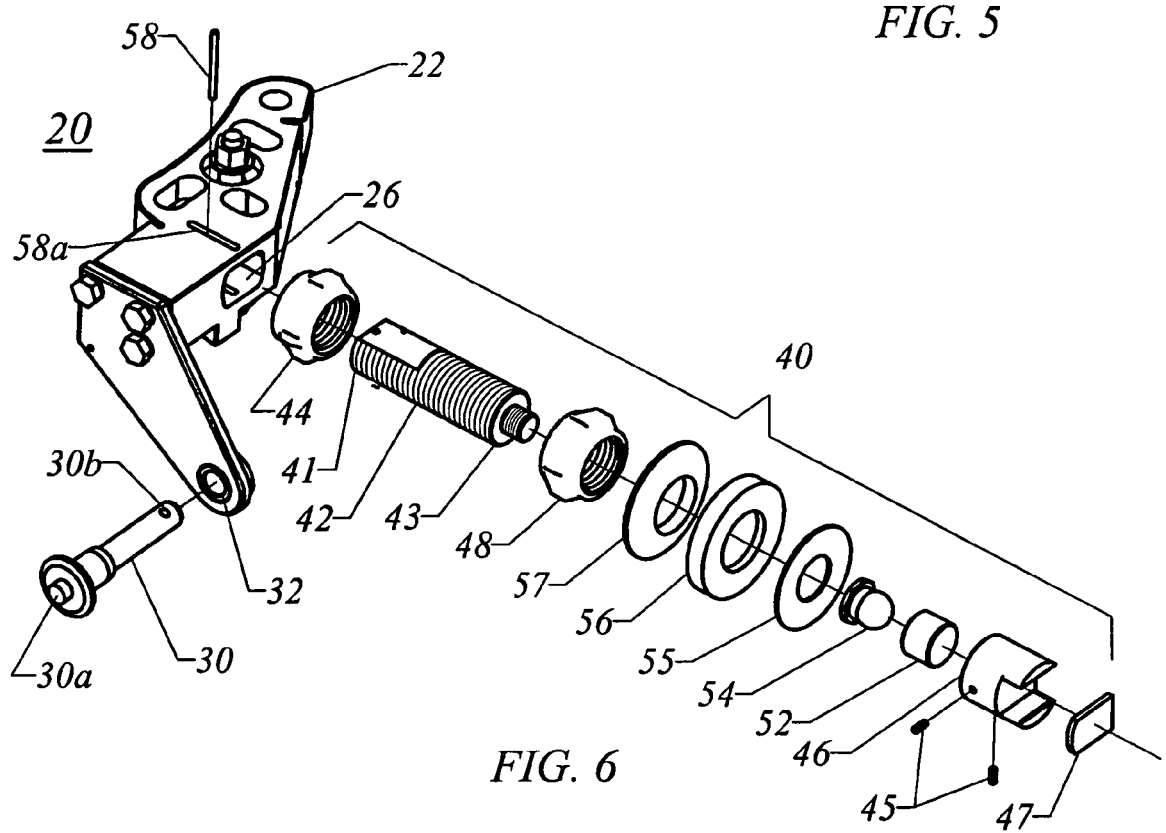
FIG. 6 is a partially exploded view of the FIG. 4 lock unit.

FIG. 4 is a front/top form of three-dimensional view of lock unit 20 alone and FIG. 5 is a corresponding back/bottom view. FIG. 6 provides an exploded view of a portion of the lock unit 20 as shown in FIG. 4. As illustrated, lock unit 20 includes a base portion 22 having, on a first side, a contact surface 24 (which may be covered by a thin contact pad of rubber or other suitable material) and, on a second side opposed to the first side, a first opening 26 (visible in FIG. 6). In the configuration shown, the main part of base portion 22 may be machined from steel stock or other suitable material, with a side part 22a of steel plate or other suitable material bolted to the main part. In other embodiments, base portion 22 may be cast or otherwise formed in one piece or multiple pieces in the same configuration as illustrated or in other suitable configurations as may be determined by skilled persons for use in particular applications.

In the embodiment shown, base portion 22 is configured to enable the lock unit 20 to be removably appended to the rotor assembly 12 (e.g., as illustrated in FIG. 2). For this purpose, the lock unit includes an insertion pin device 30 which is insertable through a second opening 32 in the lower area of side part 22a and into an opening in the rotor assembly. As shown in FIG. 4, pin device 30 is inserted through this opening, so that the opening 32 itself is not fully visible. The opening is visible in FIG. 6. The opening in the rotor assembly 12, through which pin device 30 is inserted, is visible at 12a in FIG. 3. Thus, insertion of the pin device 30 through opening 32 of the base portion 22 and into opening 12a of the rotor assembly 12, enables the lock unit to be removably appended to the rotor assembly.

Pin device 30 may be of a known type of construction in which depression of a central button 30a controls depressibility of a metallic protrusion 30b (e.g., a hemispherical steel protrusion) or of other suitable construction. In the form illustrated, pressure on button 30a permits the shaft of pin device 30 to be inserted into opening 12a in the rotor assembly and, with the release of pressure on button 30a after insertion, the non-depressibility of protrusion 30b makes pin device 30 resistant to removal from the opening 12a in the rotor assembly.

The lock unit of FIGS. 4, 5 and 6 further includes an extendible device 40, shown in an exploded view in FIG. 6. The extendible device 40 is positioned in the first opening 26 (visible in FIG. 6) and is extendible to an extended position to contact the blade pitch housing (as shown in FIG. 2). In this embodiment, extendible device 40 includes:

(i) A threaded shaft 42 having a near end 41 inserted into the first opening 26 and a far end 43.

(ii) A first nut device 44 rotatable on threaded shaft 42 to adjustably extend the threaded shaft out of the first opening. Thus, if nut device 44 is kept in contact with the base portion surface adjacent opening 26 (as it will be in use as described) rotation clockwise will advance threaded shaft 42 to the right, to contact blade pitch housing 10 as in FIG. 2. Then, when use of the lock unit is no longer desired, counterclockwise rotation of nut device 44 will draw threaded shaft further back into opening 26 and away from the blade pitch housing.

(iii) An end piece 46 extending beyond the far end 43 of threaded shaft 42. As will be further described, end piece 46 is adjustable for alignment with a surface of blade pitch housing 10.

(iv) A second nut device 48 rotatable on threaded shaft 42 to releasably secure an adjustment of end piece 46 (e.g., to lock the end piece in place in a desired alignment).

(v) A ball and socket configuration including socket fitting 52 (which may be fixed to end piece 46 by set screws 45), a ball fitting 54, a flat washer 55, a concave spherical washer 56 and a convex spherical washer 57. The ball and socket configuration may be configured to provide a known type of swivel capability by use of these components or as may otherwise be provided by skilled persons for particular applications. The end piece 46 is thus coupled to far end 43 via the ball and socket configuration.

(vi) A contact pad 47, of rubber or other suitable material to provide a surface for contact with the blade pitch housing, may be adhered to the end piece 46.

(vii) A threaded stud 58 which passes through and is slidable within a slot 58a in base portion 22 and is screwed into a hole in the near end 41 of threaded shaft 42, as represented in FIG. 6. In other embodiments a roll pin may be frictionally positioned in substitution for threaded stud 58, for example. As shown in FIG. 6, the first opening 26 may include a circumference having at least one substantially flat portion which is configured to cooperate with a flattened portion (i.e., material removed to form a flat) of the near end 41 of the threaded shaft 42 as shown in FIG. 6. With this configuration, the presence of the flat on the threaded shaft extending within the opening 26 limits rotation of threaded shaft 42 and threaded stud 58 functions as a shaft retention pin. The combination of these elements thus retains the threaded shaft within opening 26, while still permitting it to be adjustably extended outward and retracted inward, and also prevents any significant rotation of the threaded shaft 42. As a result, nut device 44 is enabled to function as a lock nut when it is rotated so as to press end piece 46 outward against a surface of blade pitch housing 10, which also results in contact surface 22 of the base portion being pressed back against a surface of rotor assembly 12.

Figure 7:
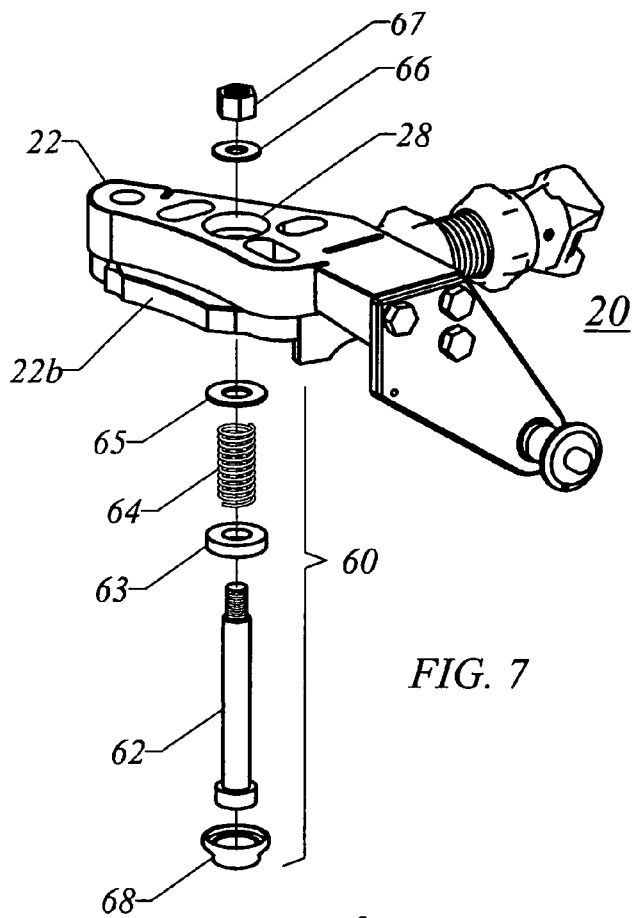
FIG. 7 is a second partially exploded view of a lock unit.

As shown in FIGS. 4 and 5, the lock unit 20 also includes a spring-loaded positioning plunger 60, for which further detail is provided in the exploded view of FIG. 7. As illustrated in FIG. 7, positioning plunger 60 is arranged to extend through third opening 28 in body portion 22. Positioning plunger 60 is configured to contact a surface 12b of the rotor assembly to aid positioning of lock unit 20 when removably appended to the rotor assembly. Positioning plunger 60 may include a shoulder bolt 62, a combination of washer 63, spring 64 and washer 65 on the unthreaded shaft portion of bolt 62, washer 66 and nut 67 on the upper threaded portion of bolt 62, and cap 68 (e.g., of rubber) covering the lower end of bolt 62. With this configuration, when lock unit 20 is placed in position appending to the rotor assembly, cap 68 contacts the upper surface of lower flange 12b of rotor assembly 12 (see FIGS. 2 and 3) causing partial compression of spring 64 and some upward displacement of bolt 62 to provide a limited force to assist in maintaining lock unit 20 in a desired position relative to upper flange 12c of the rotor assembly, with lip 22b (see FIG. 7) under upper flange 12c. This or alternate constructions may be employed by skilled persons for applications in which inclusion of a positioning plunger or other device is desired for the purpose described.

Figure 8:
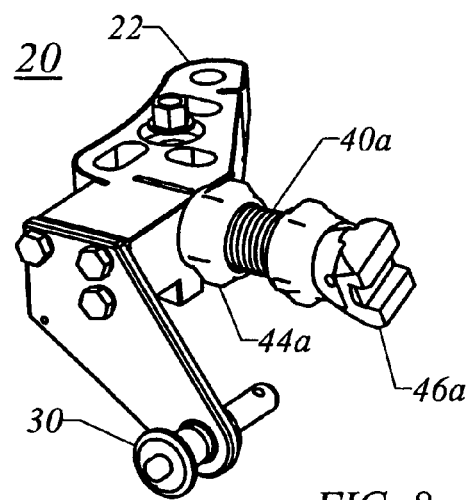
FIG. 8 is a view of a second embodiment of a lock unit from above.

Referring now to FIG. 8, there is illustrated a lock unit 20 basically as in FIG. 4, but with a second embodiment 40a of an extendible device substituted for the first embodiment 40 of FIG. 4. Extendible device 40a of FIG. 8, is shown in greater detail in the exploded view of FIG. 9. The extendible device 40a is positioned in first opening 26 and may be retained by threaded stud 58 and restrained from rotation by suitable flats, as previously described. In this embodiment, extendible device 40a includes:

(i) A threaded shaft 42a having a near end 41a inserted into the first opening 26 and a far end 43a.

(ii) A first nut device 44a rotatable on threaded shaft 42a to adjustably extend the threaded shaft out of the first opening.

(iii) An end piece 46a extending beyond the far end 43a of threaded shaft 42a.

(iv) A second nut device 48a rotatable on threaded shaft 42a to releasably secure an adjustment of end piece 46a.

Figure 9:
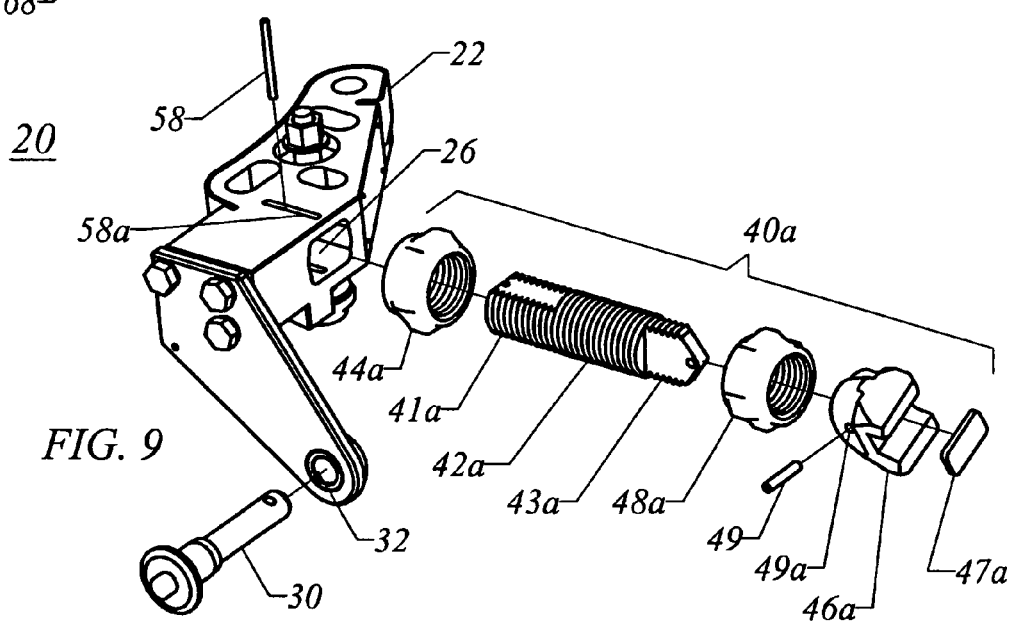
FIG. 9 is a partially exploded view of the FIG. 8 lock unit.

The extendible device 40a as configured in FIGS. 8 and 9 enables end piece 46a to be adjustable via a pivot arrangement. More particularly, end piece 46a is pinned to far end 43a via a threaded stud 49, which permits end piece 46a to pivot up and down (about an axis passing through the length of stud 49). Threaded stud 49 is inserted through a hole 49a in end piece 46a which is aligned with the hole in far end 43a. End piece 46a is thus coupled to far end 43a in a manner to enable pivoting of the end piece. To accommodate the pivot action, the back of end piece 46a and the adjacent surface of second nut device 48a may be provided with cooperating surfaces which respectively approximate portions of convex spherical and concave spherical surfaces to accommodate upward and downward pivoting of the end piece 46a. A rubber pad 47a may be positioned on a surface of end piece 46a to provide cushioning of a contact with a blade pitch housing.

The pivot capability of the extendible device 40a enables end piece 46a to make suitable contact with a contact surface of a blade pitch housing in many applications. The particular components and design of extendible device 40a may be selected and altered by skilled persons as appropriate for particular applications. For example nut devices, such as device 44a, may be of any form suitable to provide the result described and other elements may be provided or substituted as appropriate.

It will thus be appreciated that when a helicopter is beginning a period of time during which it will not be flown, a lock unit as described may be temporarily appended to the rotor assembly at the position of each blade pitch housing with attached blade. For the embodiments described, the base portion of the lock unit is placed adjacent the rotor assembly, with positioning aided by the spring loaded plunger and maintained by insertion of the insertion pin device into an opening in the rotor assembly. The extendible device can then be extended and locked to provide a structural combination effective to maintain a fixed separation between surfaces of the rotor assembly and blade pitch housing which restricts upward rotation of the blade pitch housing and attached helicopter blade. Then, when the helicopter is to resume flight operations, the lock units may readily be removed and stored for future use.

While there have been described the currently preferred embodiments of the invention, those skilled in the art will recognize that other and further modifications and implementations may be made without departing from the invention and it is intended to claim all modifications and variations as fall within the scope of the invention.

SEQUENCE LISTING (Not Applicable)

What is claimed is:

1. A lock unit usable to restrict upward rotation of a blade pitch housing attached between a rotor assembly and a helicopter blade; comprising:
   a base portion having, on a first side, a contact surface to contact said rotor assembly and, on a second side opposed to said first side, a first opening, the base portion configured to enable the lock unit to be removably appended to said rotor assembly; and
   an insertion pin device insertable through a second opening in said base portion and into an opening in said rotor assembly to removably append the lock unit to the rotor assembly; and
   an extendible device positioned in said first opening and extendible to an extended position to contact said blade pitch housing, the extendible device including
   a threaded shaft having a near end inserted into said first opening and a far end;
   a first nut device rotatable on said threaded shaft to adjustably extend the threaded shaft out of said first opening;
   an end piece extending beyond said far end of the threaded shaft and adjustable for alignment with a surface of said blade pitch housing, said end piece coupled to the far end of said threaded shaft and adjustable via a ball and socket configuration; and
   a second nut device rotatable on said threaded shaft to releasably secure an adjustment of the end piece.

2. A lock unit as in claim 1, additionally comprising:
   a spring-loaded positioning plunger extending through a third opening in said base portion and configured to contact a surface of said rotor assembly to aid positioning of the lock unit.

3. A lock unit as in claim 1, wherein the near end of said threaded shaft includes a flattened portion cooperating with a flattened portion of the circumference of said first opening to restrict rotation of the threaded shaft.

4. A lock unit as in claim 1, wherein said threaded shaft is retained in said first opening in the base portion via a pin mounted in the near end of the threaded shaft and slidable within a slot in the base portion.

5. A lock unit usable to restrict upward rotation of a blade pitch housing attached to a rotor assembly, comprising:
   a base portion having, on a first side, a contact surface to contact said rotor assembly and, on a second side opposed to said first side, a first opening, the base portion configured to enable the lock unit to be removably positioned adjacent to said rotor assembly;
   an extendible device positioned in said first opening and extendible to an extended position to contact said blade pitch housing;
   the extendible device configured to releasable retain said extended position to restrict upward rotation of the blade pitch housing; and
   a spring-loaded positioning plunger extending through a third opening in said base portion and configured to contact a surface of said rotor assembly to aid positioning of the lock unit.

6. A lock unit as in claim 5, wherein said extendible device comprises:
   a threaded shaft having a near end inserted into said first opening and a far end; and a first nut device rotatable on said threaded shaft to adjustable extend the threaded shaft out of said first opening to position said far end adjacent to said blade pitch housing.

7. A lock unit as in claim 5, additionally comprising:
an insertion pin device insertable through a second opening in said base portion and into an opening in said rotor assembly to removably append the lock unit to the rotor assembly.

8. A lock unit as in claim 6, wherein said extendable device is configured to apply a thrust force between said rotor assembly and said blade pitch housing when said first nut device is tightened to extend said extendible device into contact with said blade pitch housing and press said base portion contact surface against the rotor assembly.

9. A lock unit as in claim 6, wherein said extendible device additionally comprises:
an end piece extending beyond said far end of the threaded shaft and adjustable for alignment with a surface of said blade pitch housing; and
a second nut device rotatable on said threaded shaft to releasably secure an adjustment of the end piece.

10. A lock unit as in claim 9, wherein said end piece is coupled to the far end of said threaded shaft and adjustable via a ball and socket configuration.

11. A lock unit as in claim 9, wherein said end piece is coupled to the far end of said threaded shaft and adjustable via a pivot configuration.

12. A lock unit as in claim 6, wherein the near end of said threaded shaft includes a flattened portion cooperating with a flattened portion of the circumference of said first opening to restrict rotation of the threaded shaft.

13. A lock unit as in claim 6, wherein said threaded shaft is retained in said first opening in the base portion via a pin mounted in the near end of the threaded shaft and slidable within a slot in the base portion.

14. A lock unit usable to restrict upward rotation of a blade pitch housing attached to a rotor assembly, comprising:
a base portion having, on a first side, a contact surface to contact said rotor assembly and, on a second side opposed to said first side, a first opening, the base portion configured to enable the lock unit to be removably positioned adjacent to said rotor assembly;
an extendible device positioned in said first opening and extendible to an extended position to contact said blade pitch housing, the extendible device including
a threaded shaft having a near end inserted into said first opening and a far end, said near end including a flattened portion cooperating with a flattened portion of the circumference of said first opening to restrict rotation of the threaded shaft; and
a first nut device rotatable on said threaded shaft to adjustably extend the threaded shaft out of said first opening to position said far end adjacent to said blade pitch housing;
the extendible device configured to releasably retain said extended position to restrict upward rotation of the blade pitch housing.

15. A lock unit as in claim 14, wherein said extendible device additionally comprises:
an end piece extending beyond said far end of the threaded shaft and adjustable for alignment with a surface of said blade pitch housing; and
a second nut device rotatable on said threaded shaft to releasable secure an adjustment of the end piece.

16. A lock unit as in claim 15, wherein said end piece is coupled to the far end of said threaded shaft and adjustable via a ball and socket configuration.

17. A lock unit as in claim 15, wherein said end piece is coupled to the far end of said threaded shaft and adjustable via a pivot configuration.

18. A lock unit as in claim 14, wherein said threaded shaft is retained in said first opening in the base portion via a pin mounted in the near end of the threaded shaft and slidable within a slot in the base portion.

19. A lock unit as in claim 14, additionally comprising:
a spring-loaded positioning plunger extending through a third opening in said base portion and configured to contact a surface of said rotor assembly to aid positioning of the lock unit.

20. A lock unit as in claim 14, additionally comprising:
an insertion pin device insertable through a second opening in said base portion and into an opening in said rotor assembly to removably append the lock unit to the rotor assembly.

* * * * *